United States Patent
Harbison et al.

(10) Patent No.: US 11,455,337 B2
(45) Date of Patent: Sep. 27, 2022

(54) PREVENTING BIASED QUERIES BY USING A DICTIONARY OF CAUSE AND EFFECT TERMS

(71) Applicant: INTERNATIONAL BUSINESS MACHINES CORPORATION, Armonk, NY (US)

(72) Inventors: Aidan Harbison, Sanford, NC (US); Alissa J. Hartenbaum, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 16/418,755

(22) Filed: May 21, 2019

(65) Prior Publication Data

US 2019/0272294 A1 Sep. 5, 2019

Related U.S. Application Data

(63) Continuation of application No. 15/487,494, filed on Apr. 14, 2017, now Pat. No. 10,339,180.

(51) Int. Cl.
*G06F 16/9032* (2019.01)
*G06F 16/903* (2019.01)
(Continued)

(52) U.S. Cl.
CPC .. *G06F 16/90328* (2019.01); *G06F 16/90335* (2019.01); *G06F 40/205* (2020.01); *G06F 40/242* (2020.01); *G06F 3/0482* (2013.01)

(58) Field of Classification Search
CPC ... G06F 17/2785; G06F 17/271; G06F 17/277
See application file for complete search history.

(56) References Cited

U.S. PATENT DOCUMENTS 8,204,738 B2   6/2012   Skuratovsky
8,577,911 B1   11/2013  Stepinski et al.
(Continued)

FOREIGN PATENT DOCUMENTS

WO   2010105214 A2   9/2010

OTHER PUBLICATIONS

Puente et al. ("Extraction, analysis and representation of imperfect conditional and causal sentences by means of a semi-automatic process"; ISBN (Electronic): 978-1-4244-6921-5; ISBN (Paper): 978-1-4244-6919-2;Publication date: Jul. 1, 2010) (Year: 2010).*

(Continued)

*Primary Examiner* — Irete F Ehichioya
*Assistant Examiner* — Ken Hoang
(74) *Attorney, Agent, or Firm* — Michael O'Keefe (57) ABSTRACT

A method, computer system, and computer program product for eliminating confirmation bias in a user search query is provided. The present invention may include receiving a user-entered search query from an open ended-search tool. The invention may also include identifying a field associated with the received user-entered search query. The invention may further include creating a dictionary based on the identified field. The invention may also include determining the received user-entered search query relates to an effect by parsing the created dictionary. The invention may further include identifying one or more causes associated with the effect by parsing the created dictionary. The invention may also include generating a plurality of suggested search queries based on the one or more identified causes.

17 Claims, 6 Drawing Sheets

(51) Int. Cl.
*G06F 40/205* (2020.01)
*G06F 40/242* (2020.01)
*G06F 3/0482* (2013.01)

(56) References Cited

U.S. PATENT DOCUMENTS

| | | | |
|---|---|---|---|
| 8,694,530 | B2 | 4/2014 | Musgrove |
| 9,009,590 | B2 | 4/2015 | Todhunter et al. |
| 9,805,142 | B2 | 10/2017 | Sanghai |
| 10,339,180 | B2 | 7/2019 | Harbison |
| 2004/0243532 | A1 | 12/2004 | Steward |
| 2007/0112746 | A1 | 5/2007 | Todhunter |
| 2009/0076839 | A1 | 3/2009 | Abraham-Fuchs |
| 2015/0294029 | A1* | 10/2015 | Sanghai ............ G06F 16/90328 707/732 |
| 2015/0310114 | A1 | 10/2015 | Ryger |
| 2016/0224666 | A1* | 8/2016 | Horvitz ................. G06F 16/951 |
| 2017/0011023 | A1 | 1/2017 | Ghannam |
| 2017/0011183 | A1 | 1/2017 | Valverde, Jr. |
| 2018/0300426 | A1 | 10/2018 | Harbison |
| 2018/0300427 | A1 | 10/2018 | Harbison |

OTHER PUBLICATIONS

Excellence Assured, "NLP Cause and Effect | Milton Model pattern", https://excellenceassured.com/nlp-training/nlp-certification/cause-and-effect-milton-model, © 2017 Excellence Assured—Coaching, Training & Development, printed on Feb. 28, 2017, pp. 1-3.

Harbison et al., Pending U.S. Appl. No. 151708,317, titled Preventing Biased Queries By Using a Dictionary of Cause and Effect Terms, filed on Sep. 19, 2017, pp. 1-27.

Mell, et al., "The NIST Definition of Cloud Computing," National Institute of Standards and Technology, U.S. Department of Commerce, Special Publication 800-145, Sep. 2011, pp. 1-7.

Sorgente, et al., "Automatic extraction of cause-effect relations in Natural Language Text", http://ceur-ws.org/Vol-1109/paper4.pdf, CEUR Workshop Proceedings, ISSN 1613-0073, vol. 1109, Proceedings of the 7th International Workshop on Information Filtering and Retrieval co-located with the 13th Conference of the Italian Association for Artificial Intelligence (AI*IA 2013), Turin, Italy, Dec. 6, 2013, pp. 37-48.

Pending U.S. Appl. No. 15/487,494, filed Apr. 14, 2017, titled "Preventing Biased Queries By Using a Dictionary of Cause and Effect Terms", pp. 1-31.

IBM: List of IBM Patents or Patent Applications Treated as Related (Appendix P), Mar. 3, 2021, pp. 1-2.

* cited by examiner

PREVENTING BIASED QUERIES BY USING A DICTIONARY OF CAUSE AND EFFECT TERMS

BACKGROUND

The present invention relates, generally, to the field of computing, and more particularly to query statement modification.

A query is a question asked either verbally or in writing. In computing, a query may relate to a request for data related to a specific topic. Typically, a query is submitted as a natural language question with which to search a data repository for related information. For example, when a user conducts a search on an internet search engine, the user may input a query into the search engine in exchange for a number of results related to the user-submitted query terms. Furthermore, a suggestion to modify query terms may be presented to the user based on an analysis of the user-input query terms. For example, if a user inputs an incomplete natural language statement into a search engine, one or more search terms may be proposed to the user based on an analysis of the user-entered terms in order to complete the incomplete natural language statement.

SUMMARY

According to one embodiment, a method, computer system, and computer program product for eliminating confirmation bias in a user search query is provided. The present invention may include receiving a user-entered search query from an open ended-search tool. The invention may also include identifying a field associated with the received user-entered search query. The invention may further include creating a dictionary based on the identified field. The invention may also include determining the received user-entered search query relates to an effect by parsing the created dictionary. The invention may further include identifying one or more causes associated with the effect by parsing the created dictionary. The invention may also include generating a plurality of suggested search queries based on the one or more identified causes.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to query statement modification. The following described exemplary embodiments provide a system, method, and program product to, among other things, identify user input query terms that relate to an effect rather than a cause and provide a query term suggestion to the user. Therefore, the present embodiment has the capacity to improve the technical field of query statement modification by analyzing user input query terms to identify and eliminate potential bias within the query statement.

As previously described, a query is a question asked either verbally or in writing. In computing, a query may relate to a request for data related to a specific topic. Typically, a query is submitted as a natural language question with which to search a data repository for related information. For example, when a user conducts a search on an internet search engine, the user may input a query into the search engine in exchange for a number of results related to the user-submitted query terms. Furthermore, a suggestion to modify query terms may be presented to the user based on an analysis of the user-input query terms. For example, if a user inputs an incomplete natural language statement into a search engine, one or more search terms may be proposed to the user based on an analysis of the user-entered terms in order to complete the incomplete natural language statement.

Confirmation bias, or bias, may refer to the tendency to adopt information that confirms one's own previous understanding or hypothesis. Confirmation bias may be commonly encountered when a user submits entered query terms to a database, such as an internet search engine. For example, if an individual is experiencing a sore throat and believes the sore throat is evidence of strep throat, the individual will tend to believe information that supports the hypothesis of the user's strep throat hypothesis over other information that is contrary to the user's strep throat hypothesis. When confirmation bias is present, user query terms may be modified in favor of the bias since the user is likely to be looking for information that confirms the user bias. For example, a user may enter the query terms "Do I have asthma?" into an internet search engine in an attempt to confirm the user's self-diagnosis. Such search terms may display symptoms of individuals suffering from asthma. However, if the user does not have asthma, but only wheezing and trouble breathing, other illnesses, such as bronchitis, may be to blame. If the user searches for a confirmation of the preconceived bias, then the user may not receive accurate information. As such, it may be advantageous to, among other things, analyze user-entered query terms to identify if a bias is present and propose suggested search terms that may eliminate the present bias.

According to one embodiment, bias may be reduced or eliminated by analyzing search queries to identify when a user enters search terms related to an effect rather than a cause. When a user enters effect-related terms, one or more suggested cause-related query terms may be proposed to the user as replacements for the user-entered terms. Query terms may be deemed related to a cause or an effect based on a dictionary of cause and effect pairs that is created from a corpus in a related field. For example, one or more data repositories that present medical information may be ingested to create a dictionary of cause and effect pairs for various medical terms used within the one or more data repositories.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to reduce or eliminate bias within user-entered query terms by identifying whether a query uses effect terms rather than cause terms and suggesting one or more alternate query terms to the user.

Figure 1:
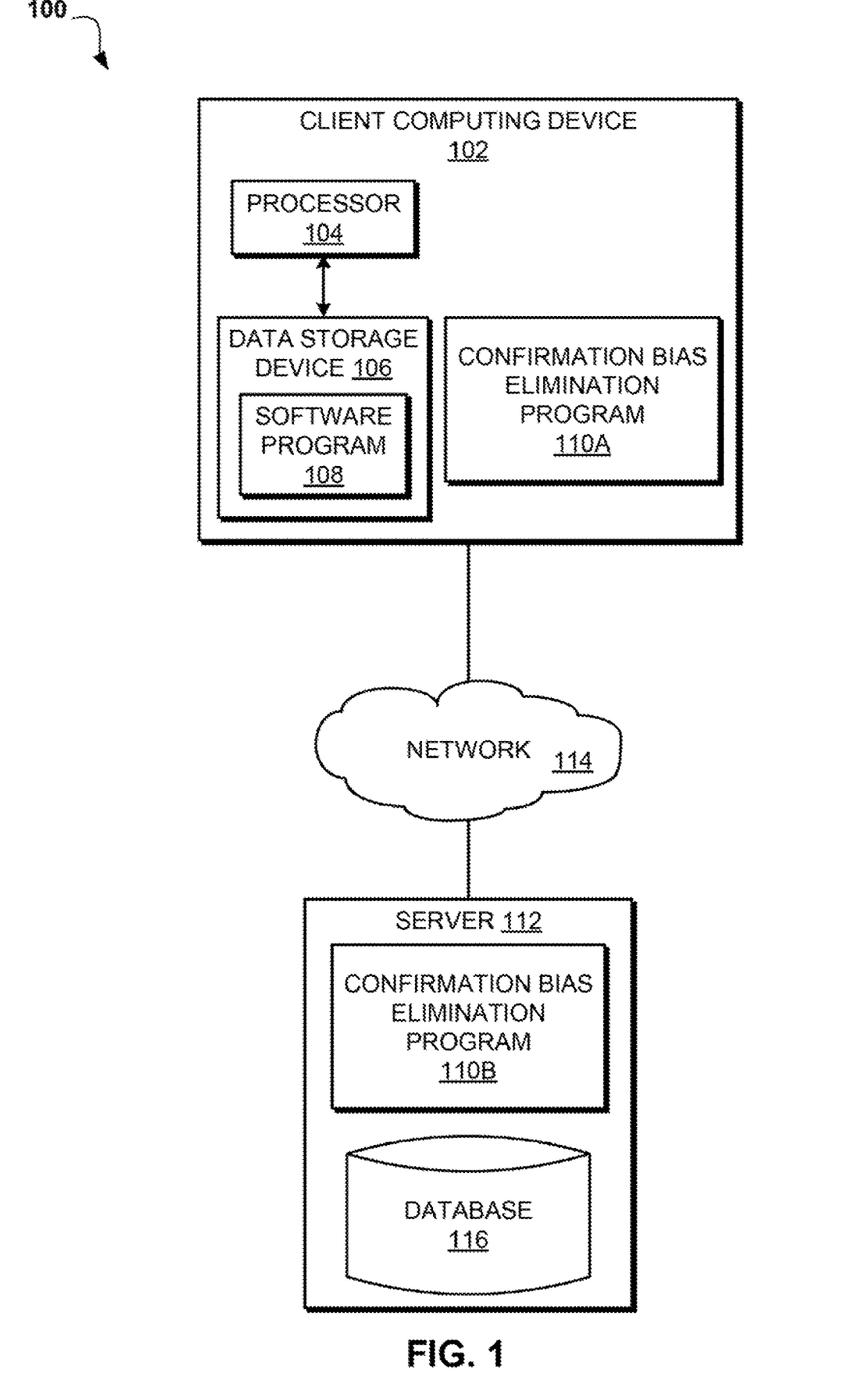
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a confirmation bias elimination program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a confirmation bias elimination program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the confirmation bias elimination program 110A, 110B may be a program capable of analyzing user-entered query terms to determine if the query terms relate to a cause or an effect. If the confirmation bias elimination program 110A, 110B determines the analyzed query terms relate to an effect, the confirmation bias elimination program 110A, 110B may generate proposed alternate cause-related query terms to display to the user in lieu of the user-entered query terms. The confirmation bias elimination method is explained in further detail below with respect to FIG. 2.

Figure 2:
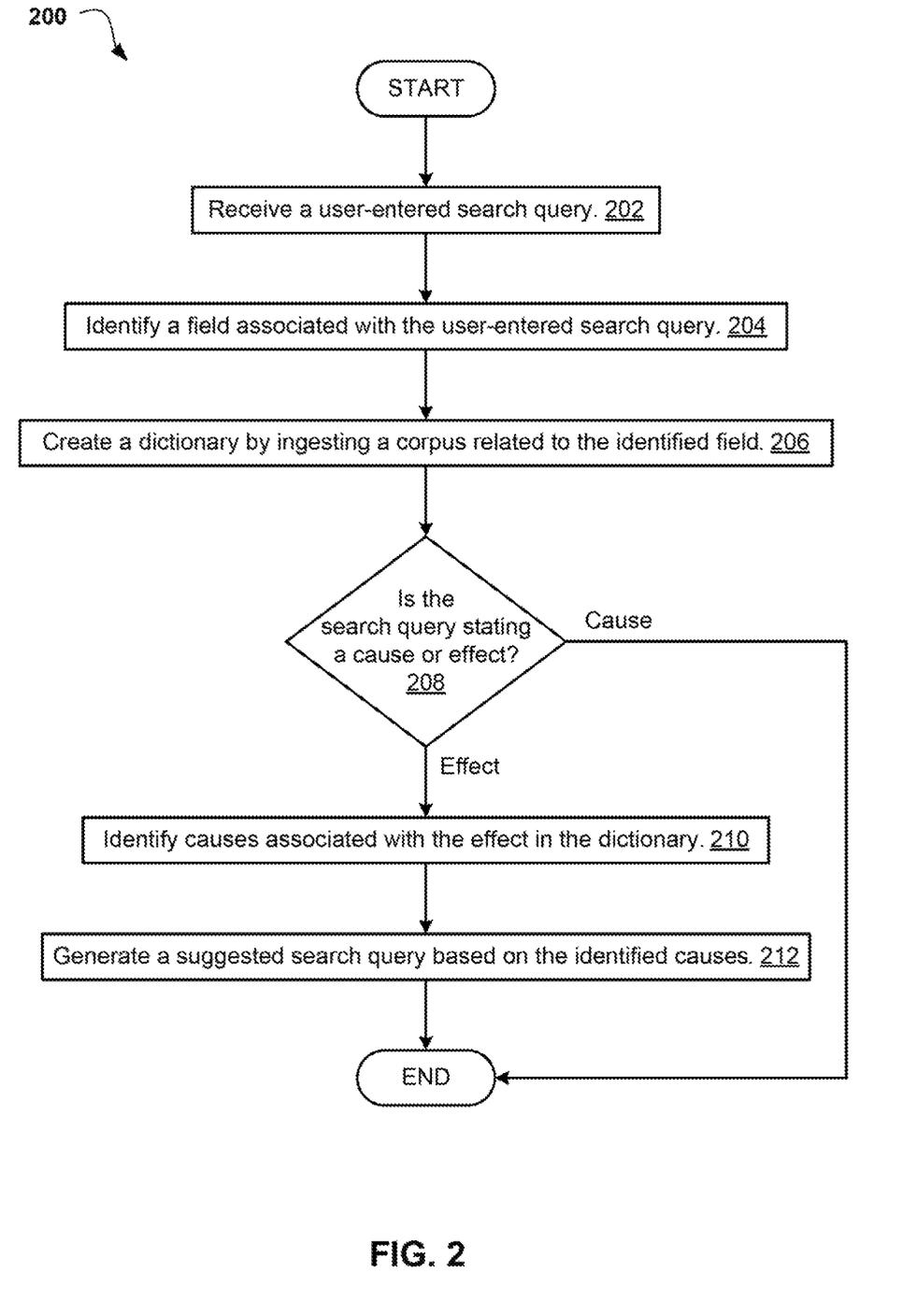
FIG. 2 is an operational flowchart illustrating a query statement modification process according to at least one embodiment.

Referring now to FIG. 2, an operational flowchart illustrating a query statement modification process 200 is depicted according to at least one embodiment. At 202, the confirmation bias elimination program 110A, 110B receives a user-entered search query. The user may enter a search query into a field, such as a text box, of an open-ended search tool, such as an internet search engine. The user-entered query may be a string of natural language text (e.g., a worded question or a statement), integers (e.g., a uniform product code or international standard book number), or one or more keywords. Once entered, the search query may be transmitted to the confirmation bias elimination program 110A, 110B on client computing device 102 or server 112 for analysis.

Then, at 204, the confirmation bias elimination program 110A, 110B identifies a field associated with the user-entered search query. Once received, the confirmation bias elimination program 110A, 110B may identify the field associated with the user-entered search query in order to analyze the search terms with the search query with the proper dictionary related to the field. The field may be the area which most closely relates to the user-entered search query. For example, if the user-entered search query received by the confirmation bias elimination program 110A, 110B is "Do I have asthma?", the confirmation bias elimination program 110A, 110B may identify the field of medicine as the field most closely related to the user-entered search query.

Next, at 206, the confirmation bias elimination program 110A, 110B creates a mapped dictionary of cause and effect terms by ingesting a corpus related to the identified field. The dictionary may be a web of connected nodes of effects and the causes of the effects where each effect may be mapped back to an array of causes. For example, if the dictionary relates to the medical field, the dictionary may connect a disease (i.e., an effect) with all known symptoms (i.e., the causes) of the disease. Since an effect may have multiple causes, an effect may be mapped to more than one cause. Similarly, since a cause may relate to multiple effects, a cause may be mapped to more than one effect. For example, in the medical field, a sore throat may be a symptom (i.e., a cause) for multiple ailments (i.e., effects). In at least one embodiment, the confirmation bias elimination program 110A, 110B may generate the dictionary by analyzing documents with factual information in the field using natural language processing for if/then statements and identifying cause and effect terms within the if/then statements. In at least one other embodiment, the confirmation bias elimination program 110A, 110B may analyze the corpus for listed causes and effects. For example, a medical journal may include a table of illnesses (i.e., effects) with all known symptoms (i.e., causes) of the illnesses rather than writing if/them statements in a written paragraph. Furthermore, when creating the dictionary, the confirmation bias elimination program 110A, 110B may label each entry as either a cause or an effect. In at least one embodiment, the confirmation bias elimination program 110A, 110B may generate the dictionary for a field prior to submission of the user-entered query terms rather than creating the dictionary when the query terms have been analyzed to determine a related field.

Then, at 208, the confirmation bias elimination program 110A, 110B determines whether the search query states a cause or an effect. According to one implementation, the query statement modification process 200 may continue along the operation flowchart, if the user-entered search query states an effect. The confirmation bias elimination program 110A, 110B may utilize natural language processing to identify the subject of the user-entered search query. For example, in the user-entered search query "Do I have asthma?", the confirmation bias elimination program 110A, 110B may identify "asthma" as the subject of the search query. The confirmation bias elimination program 110A, 110B may parse the dictionary for the "asthma" keyword in order to identify whether the "asthma" keyword entry is labeled as a cause or an effect. If the confirmation bias elimination program 110A, 110B determines the search query states an effect (step 208, "Effect" branch), the query statement modification process 200 may continue to step 210 to identify causes associated with the effect in the dictionary. If the confirmation bias elimination program 110A, 110B determines the search query states a cause (step 208, "Cause" branch), the query statement modification process 200 may terminate since not suggestion may be needed to modify the search query to eliminate bias.

Then, at 210, the confirmation bias elimination program 110A, 110B identifies causes associated with the effect in the dictionary. Upon determining the user-entered search query states an effect, the confirmation bias elimination program 110A, 110B may then identify all causes associated with the specific effect described in the user-entered search query by parsing the dictionary. For example, in the previously described situation, the dictionary may list symptoms (i.e., causes) of asthma (i.e., effect) to be "wheezing," "cough," and "trouble breathing."

Next, at 212, the confirmation bias elimination program 110A, 110B generates a suggested search query based on the mapped causes. Once the confirmation bias elimination program 110A, 110B has identified causes of the effect, the confirmation bias elimination program 110A, 110B may generate a suggested search query for each identified cause. For example, in the previously described situation, the confirmation bias elimination program 110A, 110B may generate the proposed search terms "Why am I wheezing", "What is causing my cough", and "Why am I having trouble breathing" as non-biased queries. Additionally, the confirmation bias elimination program 110A, 110B may generate a proposed search queries that incorporate more than one cause. For example, the confirmation bias elimination program 110A, 110B may generate the proposed search query "Why am I wheezing and having trouble breathing". Once the confirmation bias elimination program 110A, 110B has generated the suggested search queries, the confirmation bias elimination program 110A, 110B may display each proposed search query to the user in a graphical user interface. In at least one embodiment, the proposed search queries may be displayed in a drop down menu that allows the user to select a preferred proposed search query through user interactions with the graphical user interface. In at least one other embodiment, the confirmation bias elimination program 110A, 110B may select the proposed query terms with the lowest bias and execute the query using the selected query terms.

It may be appreciated that FIG. 2 provides only an illustration of one implementation and does not imply any limitations with regard to how different embodiments may be implemented. Many modifications to the depicted environments may be made based on design and implementation requirements. Although the above described embodiment utilized the field of medicine as an example, any field that could contain cause and effect connections may be used. For example, in the political field, the confirmation bias elimination program 110A, 110B may ingest public domain articles, legislative bills, and other government documents that show actions (i.e., causes) that lead to desired outcomes (i.e., effects). Upon receiving a user-entered query of "If we raise taxes, will education improve?", the confirmation bias elimination program 110A, 110B may analyze the query terms using known natural language processing techniques to determine the query includes the effect "improve education." The confirmation bias elimination program 110A, 110B may analyze the dictionary generated for the political field stored in a data repository, such as database 116, to identify an array of legislative actions (i.e., causes) that led to improved education, such as "raise education funding", "Project Labor Agreements", and "increase teacher wages." The confirmation bias elimination program 110A, 110B may then generate a less biased proposed search query using the identified causes and display each proposed search query to the user for selection. Once selected, the search query may be executed using an open-ended search tool, such as an internet search engine.

Figure 3:
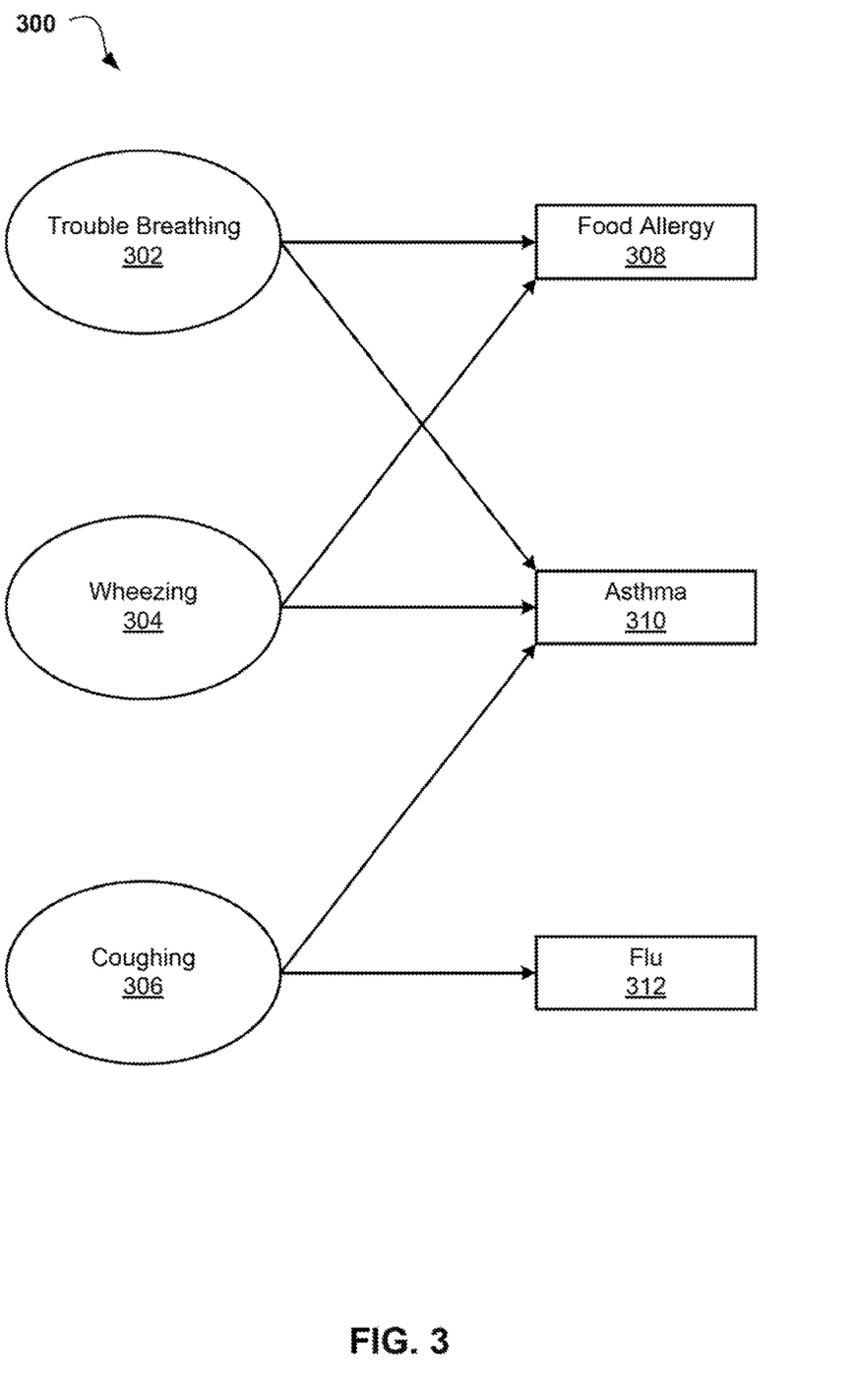
FIG. 3 is a functional block diagram of a dictionary pairing causes and effects according to at least one embodiment.

Referring now to FIG. 3, a functional block diagram of a dictionary 300 pairing causes and effects is depicted, according to at least one embodiment. As previously described, the dictionary 300 may be a web of connected nodes of effects and the causes of the effects where each effect may be mapped back to an array of causes. The confirmation bias elimination program 110A, 110B may parse the dictionary 300 when a search query is determined to state an effect, such as "food allergy" 308, "asthma" 310, and "flu" 312. Once the confirmation bias elimination program 110A, 110B locates the effect within the dictionary 300, the confirmation bias elimination program 110A, 110B may identify each cause mapped to the specific affect in the dictionary 300. For example, if "asthma" 310 is identified by the confirmation bias elimination program 110A, 110B to be the subject of the user-entered search query, the confirmation bias elimination program 110A, 110B may identify the causes "trouble breathing" 302, "wheezing" 304, and "coughing" 306 as associated with "asthma" 310 since each cause is mapped to the effect. The confirmation bias elimination program 110A, 110B may then create a proposed search query for each cause, such as "I have trouble breathing" or "what is causing my cough", and display the proposed search queries to a user.

Figure 4:
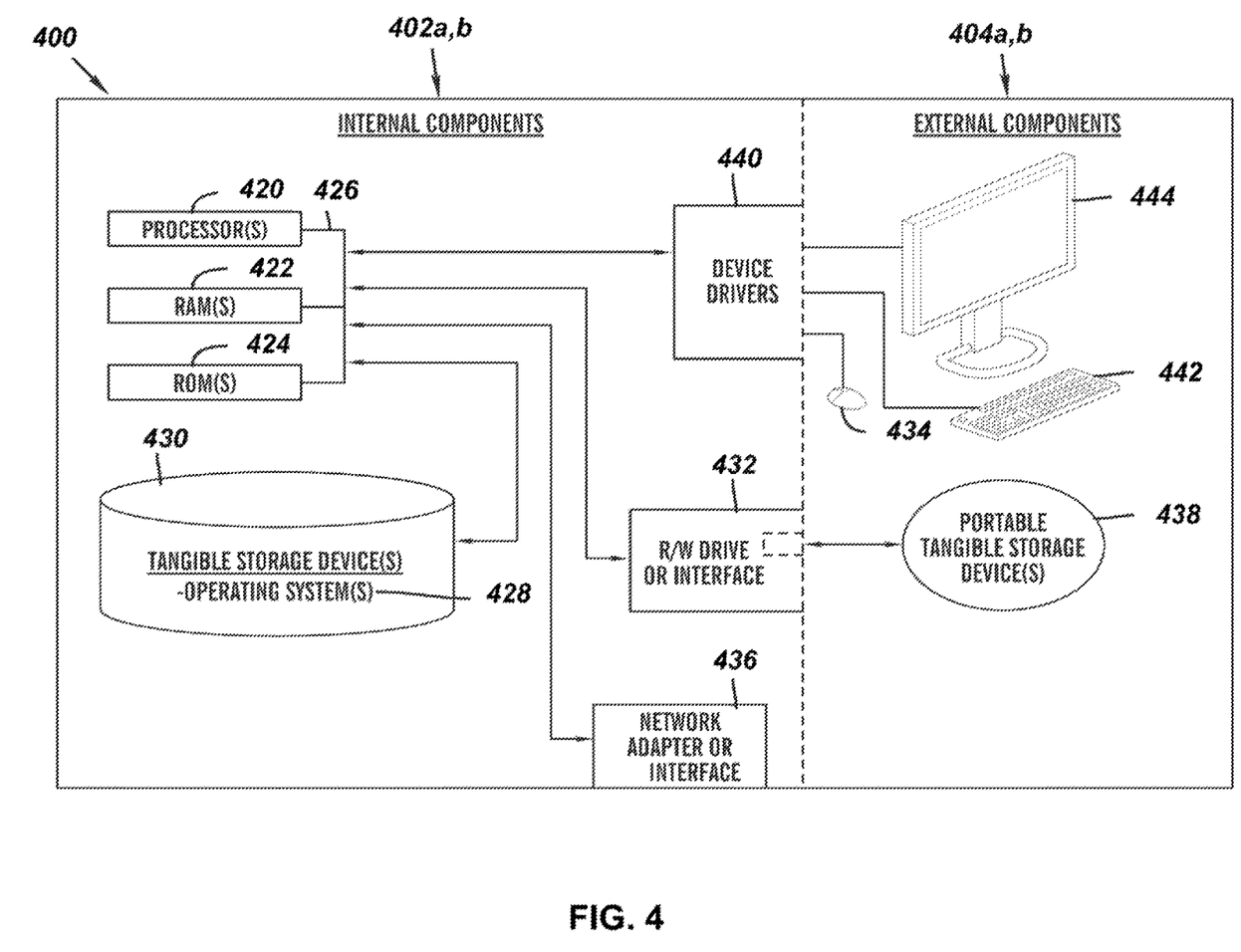
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402*a,b* and external components 404*a,b* illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the confirmation bias elimination program 110A in the client computing device 102 and the confirmation bias elimination program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402*a,b* also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the confirmation bias elimination program 110A, 110B, can be stored on one or more of the respective portable computer-readable tangible storage devices 438, read via the respective R/W drive or interface 432, and loaded into the respective hard drive 430.

Each set of internal components 402*a,b* also includes network adapters or interfaces 436 such as a TCP/IP adapter cards, wireless Wi-Fi interface cards, or 3G or 4G wireless interface cards or other wired or wireless communication links. The software program 108 and the confirmation bias elimination program 110A in the client computing device 102 and the confirmation bias elimination program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the confirmation bias elimination program 110A in the client computing device 102 and the confirmation bias elimination program 110B in the server 112 are loaded into the respective hard drive 430. The network may comprise copper wires, optical fibers, wireless transmission, routers, firewalls, switches, gateway computers and/or edge servers.

Each of the sets of external components 404*a,b* can include a computer display monitor 444, a keyboard 442, and a computer mouse 434. External components 404*a,b* can also include touch screens, virtual keyboards, touch pads, pointing devices, and other human interface devices. Each of the sets of internal components 402*a,b* also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
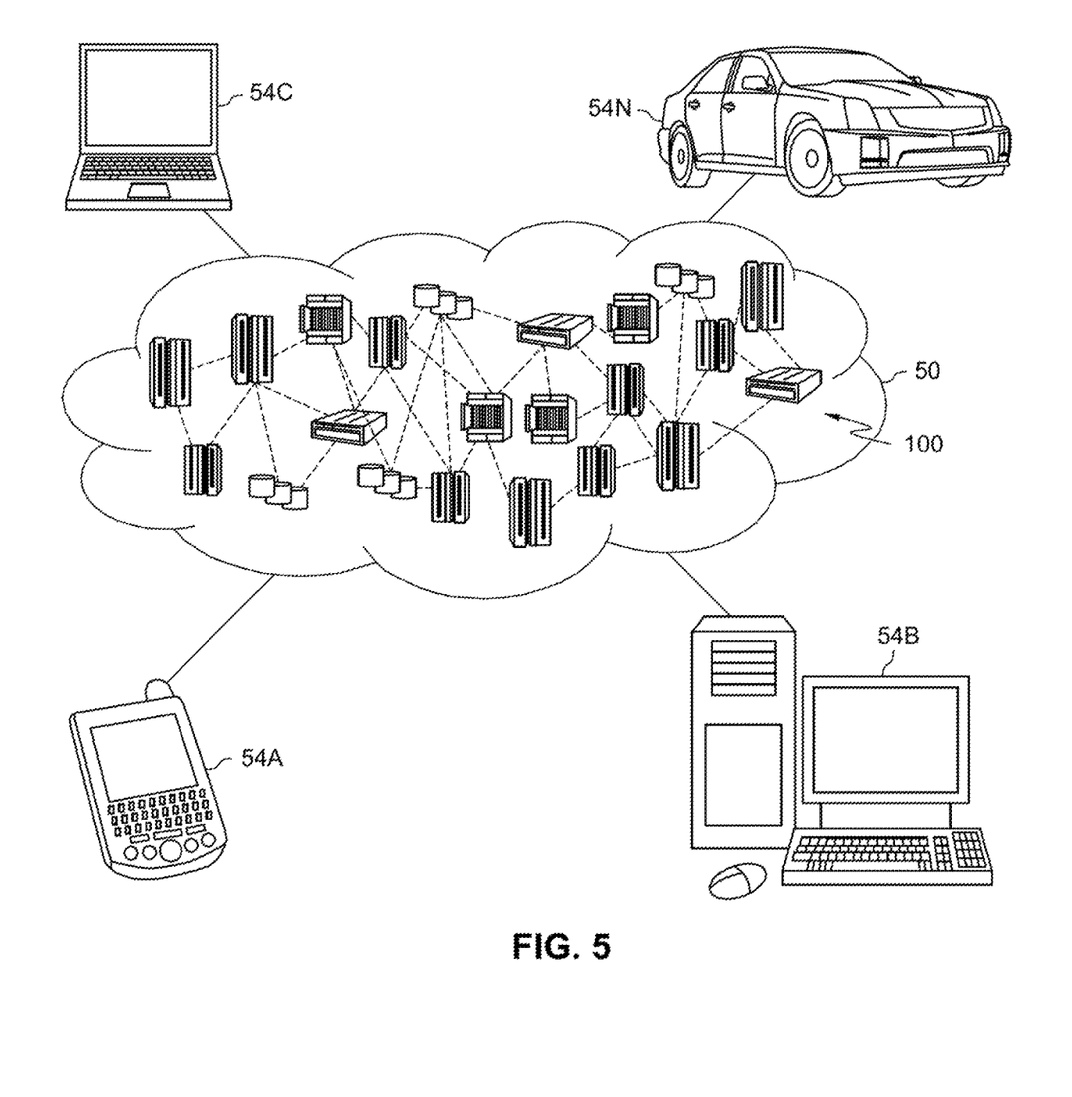
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
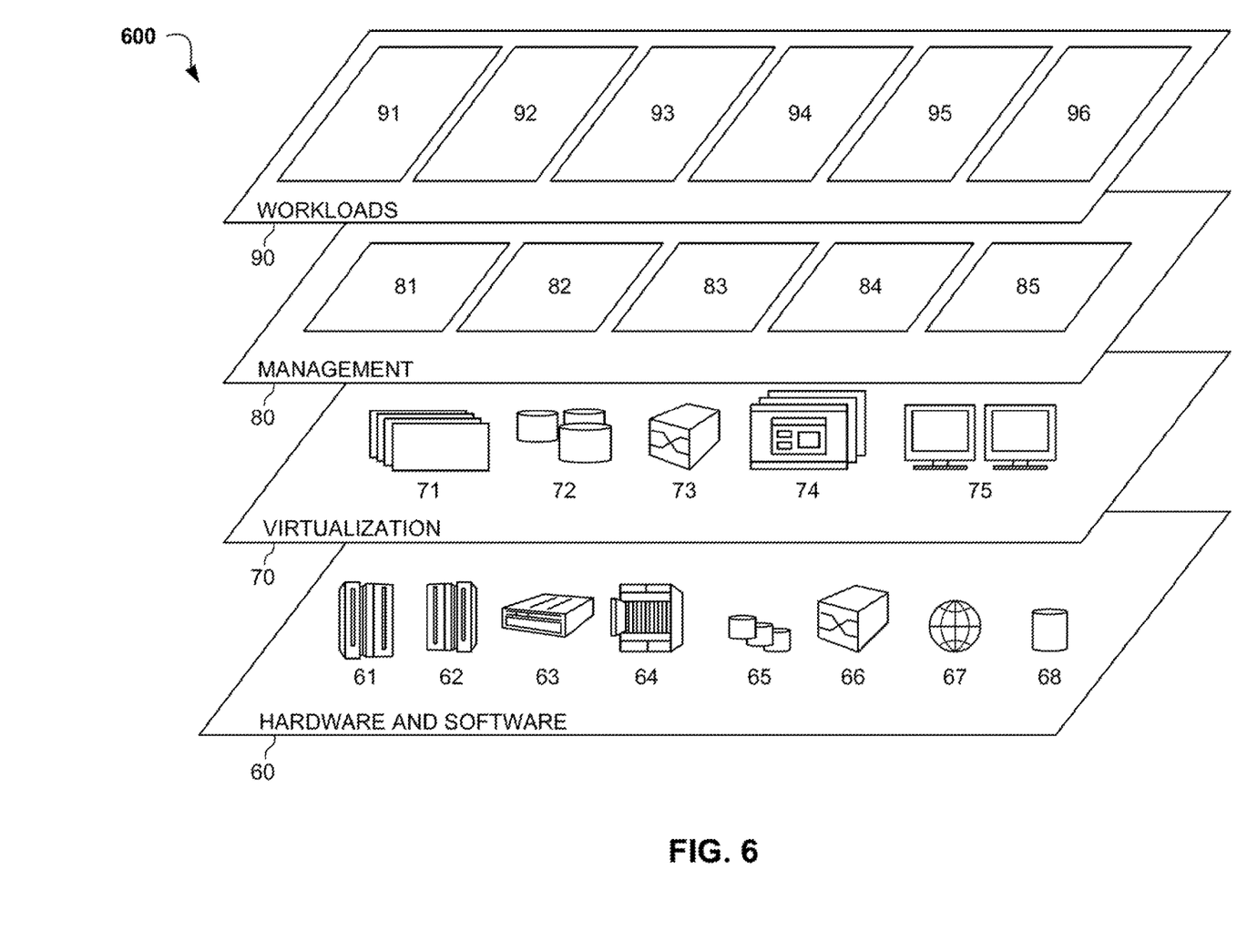
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and confirmation bias elimination 96. Confirmation bias elimination 96 may relate to analyzing user-entered query terms to identify a bias within the query terms and proposing alternate query terms that may eliminate the identified bias.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for eliminating confirmation bias in a user search query, the method comprising:

identifying a field associated with a user-entered search query;

creating a dictionary based on the identified field, wherein creating the dictionary further comprises:

analyzing a plurality of documents with a plurality of factual information in the identified field for one or more if/then statements using one or more natural language processing techniques, wherein the plurality of documents comprise a public domain article, a legislative bill, and a medical journal;

identifying one or more cause and effect terms within one or more if/then statements in the plurality of documents with a plurality of factual information in the identified fields;

labeling the one or more identified cause and effect terms as either a cause or an effect; and mapping each cause to one or more effects and each effect to one or more causes using the plurality of factual information;

determining the received user-entered search query relates to an effect by parsing the created dictionary;

identifying one or more causes associated with the effect by parsing the created dictionary; and generating a plurality of suggested search queries based on the one or more identified causes, wherein each suggested search query expressly mentions each cause associated with the effect.

2. The method of claim 1, wherein the dictionary comprises a web of a plurality of connected nodes, and wherein each node within the plurality of connected nodes is either a cause or an effect, and wherein each effect within a plurality of effects is mapped to an array of one or more causes.

3. The method of claim 1, further comprising:
selecting a query of the generated plurality of suggested search queries; and
executing the selected query in the open-ended search tool.

4. The method of claim 1, wherein the identified field is an area most closely related to the user-entered search query.

5. The method of claim 1, wherein the user-entered search query is selected from a group consisting of a string of a plurality of natural language text, one or more integers, and one or more keywords.

6. The method of claim 1, wherein creating the dictionary further comprises:
identifying one or more cause and effect terms within a plurality of documents with a plurality of factual information in the identified field;
labeling the identified one or more cause and effect terms as either a cause or an effect; and
mapping each cause to one or more effects and each effect to one or more causes using the plurality of factual information.

7. A computer system for eliminating confirmation bias in a user search query, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
identifying a field associated with a user-entered search query;
creating a dictionary based on the identified field, wherein creating the dictionary further comprises:
analyzing a plurality of documents with a plurality of factual information in the identified field for one or more if/then statements using one or more natural language processing techniques, wherein the plurality of documents comprise a public domain article, a legislative bill, and a medical journal;
identifying one or more cause and effect terms within one or more if/then statements in the plurality of documents with a plurality of factual information in the identified fields;
labeling the one or more identified cause and effect terms as either a cause or an effect; and
mapping each cause to one or more effects and each effect to one or more causes using the plurality of factual information;
determining the received user-entered search query relates to an effect by parsing the created dictionary;
identifying one or more causes associated with the effect by parsing the created dictionary; and
generating a plurality of suggested search queries based on the one or more identified causes, wherein each suggested search query expressly mentions each cause associated with the effect.

8. The computer system of claim 7, wherein the dictionary comprises a web of a plurality of connected nodes, and wherein each node within the plurality of connected nodes is either a cause or an effect, and wherein each effect within a plurality of effects is mapped to an array of one or more causes.

9. The computer system of claim 7, further comprising:
selecting a query of the generated plurality of suggested search queries; and
executing the selected query in the open-ended search tool.

10. The computer system of claim 7, wherein the identified field is an area most closely related to the user-entered search query.

11. The computer system of claim 7, wherein the user-entered search query is selected from a group consisting of a string of a plurality of natural language text, one or more integers, and one or more keywords.

12. The computer system of claim 7, wherein creating the dictionary further comprises:
identifying one or more cause and effect terms within a plurality of documents with a plurality of factual information in the identified field;
labeling the identified one or more cause and effect terms as either a cause or an effect; and
mapping each cause to one or more effects and each effect to one or more causes using the plurality of factual information.

13. A computer program product for eliminating confirmation bias in a user search query, the computer program product comprising:
one or more computer-readable tangible storage media and program instructions stored on at least one of the one or more tangible storage media, the program instructions executable by a processor capable of performing a method, the method comprising:
identifying a field associated with a user-entered search query;
creating a dictionary based on the identified field, wherein creating the dictionary further comprises:
analyzing a plurality of documents with a plurality of factual information in the identified field for one or more if/then statements using one or more natural language processing techniques, wherein the plurality of documents comprise a public domain article, a legislative bill, and a medical journal;
identifying one or more cause and effect terms within one or more if/then statements in the plurality of documents with a plurality of factual information in the identified fields;

labeling the one or more identified cause and effect terms as either a cause or an effect; and mapping each cause to one or more effects and each effect to one or more causes using the plurality of factual information;

determining the received user-entered search query relates to an effect by parsing the created dictionary;

identifying one or more causes associated with the effect by parsing the created dictionary; and generating a plurality of suggested search queries based on the one or more identified causes, wherein each suggested search query expressly mentions each cause associated with the effect.

14. The computer program product of claim 13, wherein the dictionary comprises a web of a plurality of connected nodes, and wherein each node within the plurality of connected nodes is either a cause or an effect, and wherein each effect within a plurality of effects is mapped to an array of one or more causes.

15. The computer program product of claim 13, further comprising:

selecting a query of the generated plurality of suggested search queries; and executing the selected query in the open-ended search tool.

16. The computer program product of claim 13, wherein the identified field is an area most closely related to the user-entered search query.

17. The computer program product of claim 13, wherein the user-entered search query is selected from a group consisting of a string of a plurality of natural language text, one or more integers, and one or more keywords.

* * * * *